Oct. 27, 1970 P. M. BUHLER 3,536,864
TESTING AND HALF-TAPPING MEANS FOR TELEPHONE LINES
Filed June 9, 1967
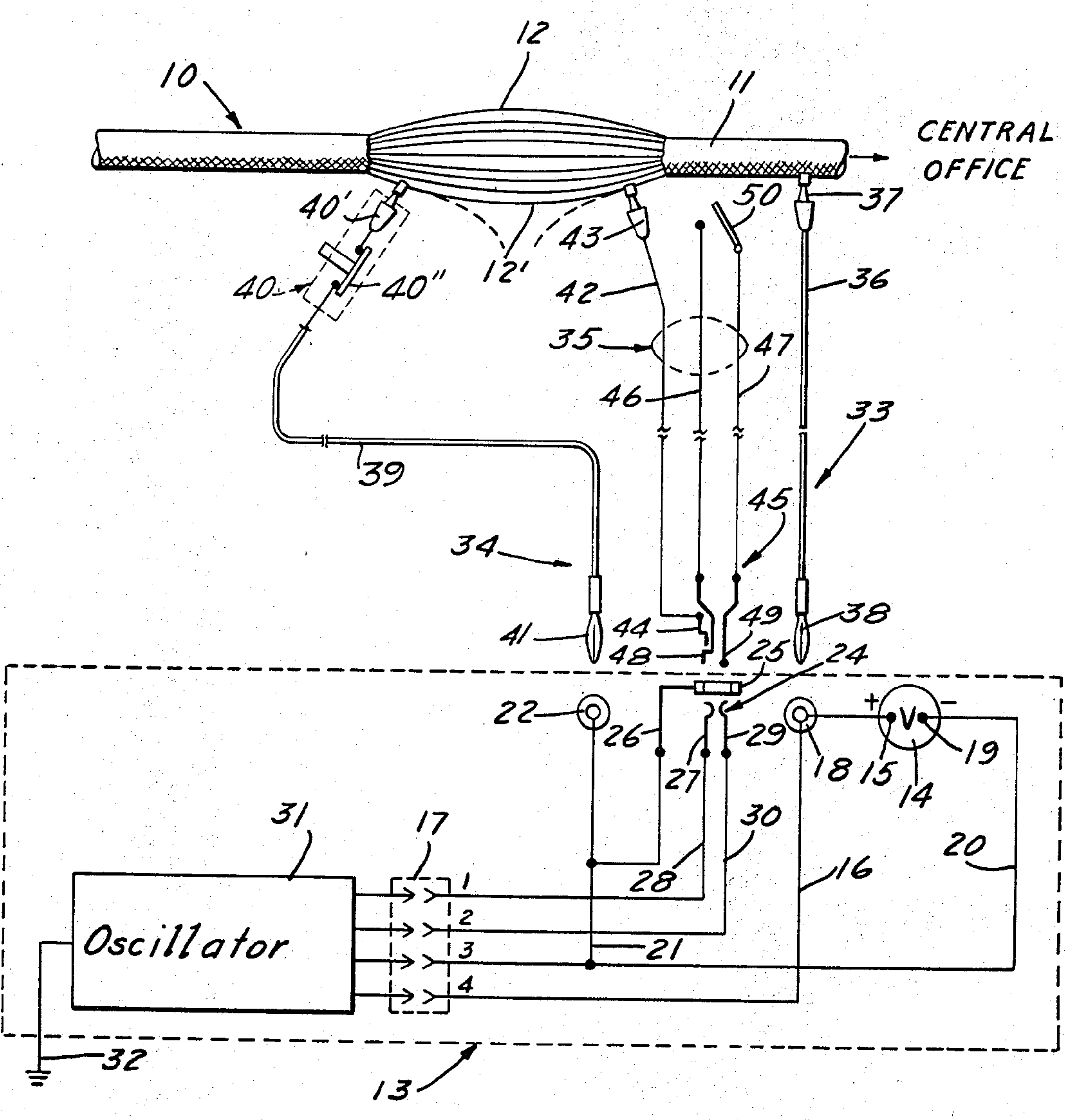
Peter M. Buhler,
INVENTOR.
BY Paul A. Weilein
Attorney 3,536,864
TESTING AND HALF-TAPPING MEANS FOR TELEPHONE LINES

Peter M. Buhler, 4807 N. Baldwin Ave., Temple City, Calif. 91780

Filed June 9, 1967, Ser. No. 644,918
Int. Cl. H04m *1/24*
U.S. Cl. 179—175 7 Claims

ABSTRACT OF THE DISCLOSURE

A portable field testing and half-tapping device comprising a system in which a voltmeter has a positive terminal connectable through a grounding clip cord with the sheath of a telephone cable, and a negative terminal connectable through a half-tap cord circuit and a test-tone cord circuit to spaced points on one of a pair of connectors to be tested, these cord circuits having similar electrical resistance characteristics and being respectively connectable with the conductor by means of a clip, the clip for the half-tap cord circuit being in series with the contacts of a normally closed pushbutton switch.

A tone producing oscillator is operatively associated with the cord circuits in a conventional coupled circuit arrangement including a manually operable switch by which the oscillator may be activated and deactivated from a remote point.

BACKGROUND OF THE INVENTION

The invention pertains to telephone testing devices.

The present invention constitutes improvements in the basic testing and half-tapping device as disclosed in my Pat. No. 3,084,232, issued Apr. 2, 1963, covering Testing and Half-Tapping Means for Telephone Lines.

The above noted patent proposes testing and half-tapping means whereby it is possible to open a cable conductor of a telephone line, which is in use, without interference or the knowledge of the user, and by operations conducted in the field without the necessity of the services of the test board man at the central office. Briefly, a voltmeter or other potential responsive device is utilized in the patent arrangement and has one of its terminals connected by separate clip connectors with a main tapping circuit and a half-tapping circuit, these two circuits having different resistance components so that there will be a visible difference in the indicated voltage, depending upon which circuit is tapped to the line conductor. The voltage readings thus form a visual indication and assure the user that contact has in fact been established with the conductor through the tapping circuits. By connecting the tapping circuits at spaced points on the conductor, an auxiliary electric flow path is established which permits opening of the line between these two points without interference or interruption of the service.

While the patented arrangement has proved extremely useful and successful in solving the inherently objectionable problems heretofore existing in the telephone line testing field, it has been found that in some instances the difference in the resistance characteristics of the two circuits is objectionable in that significantly different deflections of the voltmeter needle are not always obtained. As a consequence, with the testing procedure as utilized in the patented disclosure, the indications may be more or less difficult to interpret. The present invention is therefore primarily concerned with improved means for overcoming this aspect and problem attending use of the device of my previous patent.

SUMMARY OF INVENTION

The present invention relates to telephone line testing and alterations thereof, and more particularly to the field testing of telephone lines to determine whether such lines are in service, and means whereby line conductors may be opened without service interference or interruption.

In its broad concept, the present invention proposes to utilize a test-tone cord circuit connector, and half-tap circuit connector having similar electrical resistance characteristics, and which are so utilized as to provide positive deflections of a voltmeter, these deflections being independently notable and serving to indicate that positive connections have been established through the connector clips of the circuits with the line to be tapped.

It is therefore a primary object of the herein disclosed invention to provide an improved testing device of the herein described character which is susceptible of improved and more facile operation, and in which the various tests may be conducted without having to disturb the clip connectors by which the tapping circuits are connected to the telephone conductor being tested.

A still further object resides in the provision of an improved clip connector for utilization on the half-tap cord, the clip being provided in a unit which includes a pushbutton switch having normally closed contacts for manually opening the circuit without disturbing the clip connections with the telephone conductor under test.

Further objects of the invention will be brought about in the following part of the specification, wherein detailed description is for the purpose of fully disclosing the invention without placing limitations thereon.

BRIEF DESCRIPTION OF DRAWINGS

Referring to the accompanying drawings, the single figure is a view schematically showing the electrical circuitry as embodied in the device of the present invention.

DESCRIPTION OF THE PREFERRED EMBODIMENT

Referring more specifically to the drawing, the invention is diagrammatically shown as being utilized in connection with a telephone cable as generally indicated at 10, this cable having an outer sheath 11 of conventional construction, the sheath being shown as having been removed to expose a plurality of cable conductors 12 constituting the conductor pairs of the telephone lines contained in the cable.

The components and instrumentalities comprising the present invention, are associated in a portable test unit as generally indicated by the numeral 13. This unit includes a voltmeter 14 or other conventional device which will respond to electrical potential, this voltmeter having a terminal 15 which is connected through a conductor 16 with terminal 4 of a plug-jack unit 17. The conductor 16 contains a ground jack 18. The other terminal 19 of the voltmeter is connected through conductor 20 with terminal 3 of the unit 17.

A branch conductor 21 is connected from conductor 20 to a half-tap jack 22.

A main or test-tone jack 24 is provided, this jack having a sleeve 25 which is connected through conductor 26 to conductor 21. A ring contact 27 is connected through conductor 28 to terminal 1 of unit 17, while tip contact 29 of the jack is connected through conductor 30 to terminal 2 thereof.

The elements of the unit thus far described are connected by means of the plug-receptacle unit 17 with a conventional tone producing device 31 comprising an oscillator circuit which is shown as being grounded at 32. This oscillator is capable of producing a frequency of the order of five hundred cycles with a seven cycle warble, this tone having been found to be advantageous in the testing of telephone lines. The details of the tone producing device are not material to the present invention and therefore will not be specifically described herein, but reference may be made to Section G86,060.9, Issue 1, January 1949, A.T. & T. Co Standard of the Manual of Bell System Practices, of the American Telephone and Telegraph Company, wherein such details are specifically shown and described. The tone producing device is self-contained in that it requires no outside source of current but has its own batteries.

In utilizing the unit 13, connections are made with the telephone line conductors and cable sheath by means of a grounding cord 33, half-tap cord 34 and test-tone cord 35.

The grounding cord 33 comprises a conductor 36 fitted with a clip 37 at one end which may be clipped to the grounded cable sheath 11, and a single contact plug 38 at its other end by which connection may be established with the ground jack 18.

The half-tap cord is similarly comprised of a conductor 39, connecting device 40 and plug 41 connectable with jack 22. The connection device 40 includes a clip 40′ connected in series with a normally closed pushbutton switch 40″. While the clip and switch are shown as being included in the connection device as a unit, they may be provided as separate elements, if desired.

The test-tone cord comprises a conductor 42 having a clip 43 at one end and a connection to a sleeve 44 at its other end, this sleeve constituting one of the contact elements of a plug 45 adapted to mate with the jack 24. The test-tone cord also contains a pair of conductors 46 and 47 which connect a ring 48 and tip 49 of the jack to the terminal connections of a switch 50. While the switch has been illustrated as being separate from the clip 43, the switch may be constructed as a unitary part of the clip.

For circuit identification and tone-testing, the unit will be utilized in a manner similar to that described in detail in my previously mentioned Pat. No. 3,084,232. Briefly, this may be explained as follows. with the clip 37 connected to ground, which may be the cable sheath, the half-tap cord 39 is first attached at one side of the cable sheath opening to the conductor to be half-tapped, in this case conductor 12′, by means of the clip 40′. A circuit is thus established through the voltmeter 14.

A voltmeter reading is now taken, which indicates that a positive contact has been made by the clip 40′ with the conductor under test, and whether or not the circuit is in service. The test-tone clip 43, with the switch 50 in open position, is then attached at the other side of the sheath opening to the same conductor 12′. Without disturbing the contact previously established through clip 40′, the pushbutton switch 40″ may now be opened so as to disconnect the voltmeter circuit through the half-tap cord 39, and thereby permit a voltmeter reading through the connected test-tone cord only. If a reading is established, this will indicate that a positive contact has been made by means of the clip 43. When the voltmeter indicates that the circuit is not in use or that the circuit is a spare, then the switch 50 may be closed to activate the tone producing device and impose a testing tone on the circuit to permit normal procedures of testing, identifying, splicing and crossing over of lines, or other operations which may be required.

If the operation calls for opening of the conductor 12′, this may now be proceeded with without interrupting or interfering with the service on this line. Thus, the cord 34 and 35 provide an auxiliary electrical flow path between the clips 40′ and 43 when the conductor 12′ therebetween is opened as shown in dotted lines. Continuity is thus preserved.

Various modifications may suggest themselves to those skilled in the art, without departing from the spirit of the invention, and, hence, I do not wish to be restricted to the specific forms as shown or uses mentioned, except to the extent indicated in the appended claims.

I claim:

1. A system for field testing and half-tapping a conductor of a telephone line pair in a cable, wherein full voltage is divided between the conductors of the line when the line is in service and said full voltage is applied to one of said conductors, when said line is not in service, comprising:

(a) means for selectively indicating the line voltage condition;

(b) means for tapping said indicating means to a conductor of said line through a first circuit to determine whether it is in service or not in service; and (c) means for tapping said indicating means to said conductor of the line through a second circuit at a point adjacent the first tapping connection, said circuits having substantially equal resistance characteristics.

2. A system according to claim 1, wherein the first circuit includes a switch having normally closed contacts.

3. A system according to claim 1, wherein the tapping means for the first circuit includes a connection clip in series with a switch having normally closed contacts.

4. A system according to claim 3, wherein the clip and switch are embodied into a single unitary connection device structure.

5. A system for field testing and half-tapping a conductor of a telephone line pair in a cable having a grounded sheath, comprising:

(a) potential indicating means having a pair of connection terminals;

(b) tapping means for releasably connecting one of said terminals to the cable sheath; and (c) independent tapping means for connecting the other of said terminals through separate circuits having similar electrical characteristics to adjacent points on an identified conductor of a telephone line pair in a cable, said independent tapping means comprising a first circuit normally completed through a switch having normally closed contacts.

6. A system according to claim 5, including electrical signal producing means operatively associated with said independent tapping means, and control means including a switch in a second circuit of said independent tapping means operable to activate and deactivate said signal means.

7. In a system for field testing and half-tapping a conductor of a telephone line pair in a cable, wherein full voltage is divided between the conductors of the line when the line is in service and said full voltage is applied to one of said conductors, when said line is not in service, and having means for selectively indicating the line voltage condition, means including a clip connector for tapping said indicating means to a conductor of said line through a first circuit to determine whether it is in service or not in service, and means including a clip connector for tapping said indicating means to said conductor of the line through a second circuit at a point adjacent the first tapping connection, the improvement in which said first and second circuits have substantially equal resistance characteristics, and said first circuit includes means other than said clip connector for interrupting current flow through the circuit.

References Cited

UNITED STATES PATENTS

| | | | |
|---|---|---|---|
| 1,769,962 | 7/1930 | Nyquist | 179—175 |
| 2,212,290 | 8/1940 | Fisher et al. | 324—66 |
| 3,084,230 | 4/1963 | Buhler | 179—175 |
| 3,084,232 | 4/1963 | Buhler | 179—175.25 |

KATHLEEN CLAFFY, Primary Examiner

DAVID L. STEWART, Assistant Examiner